UNITED STATES PATENT OFFICE.

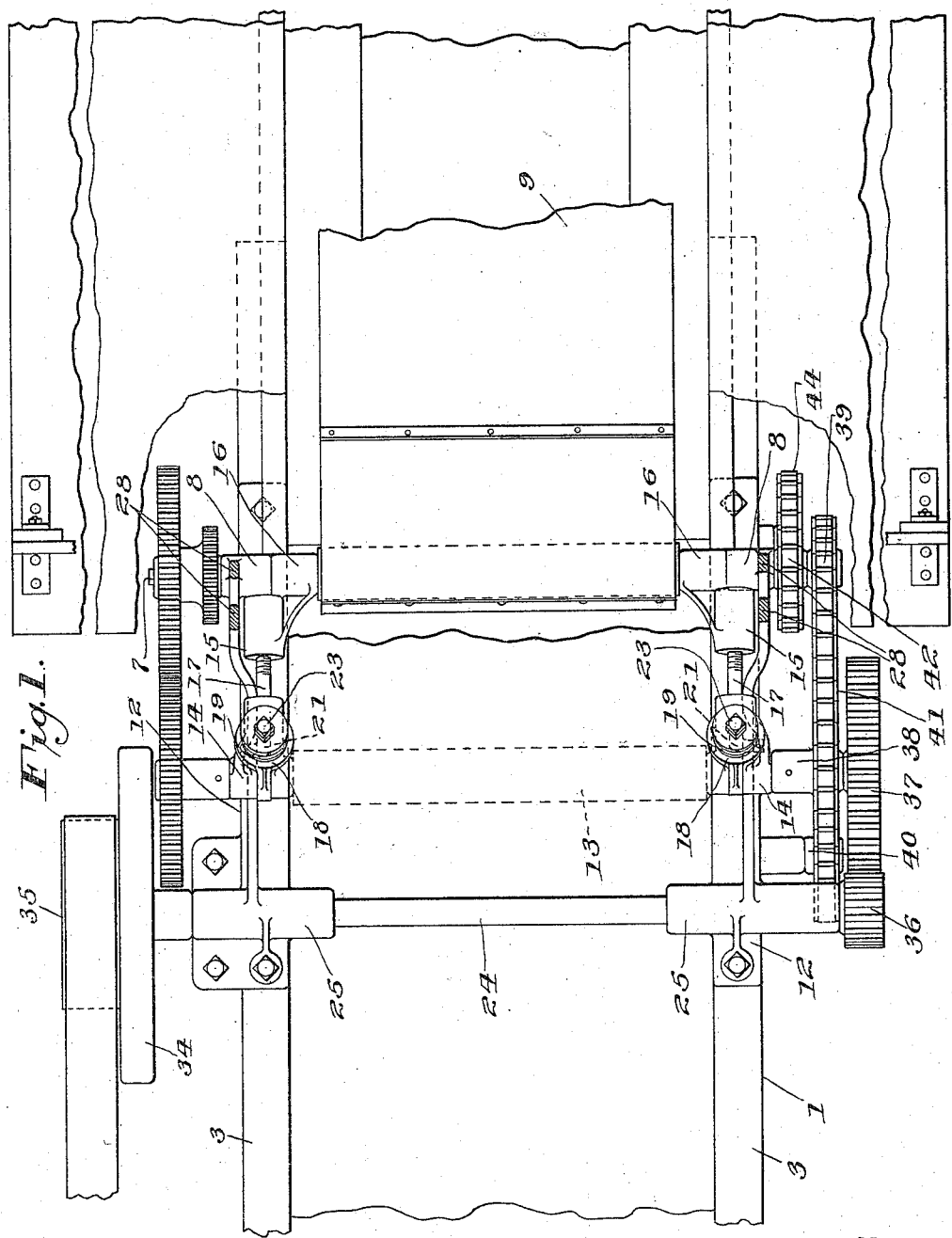

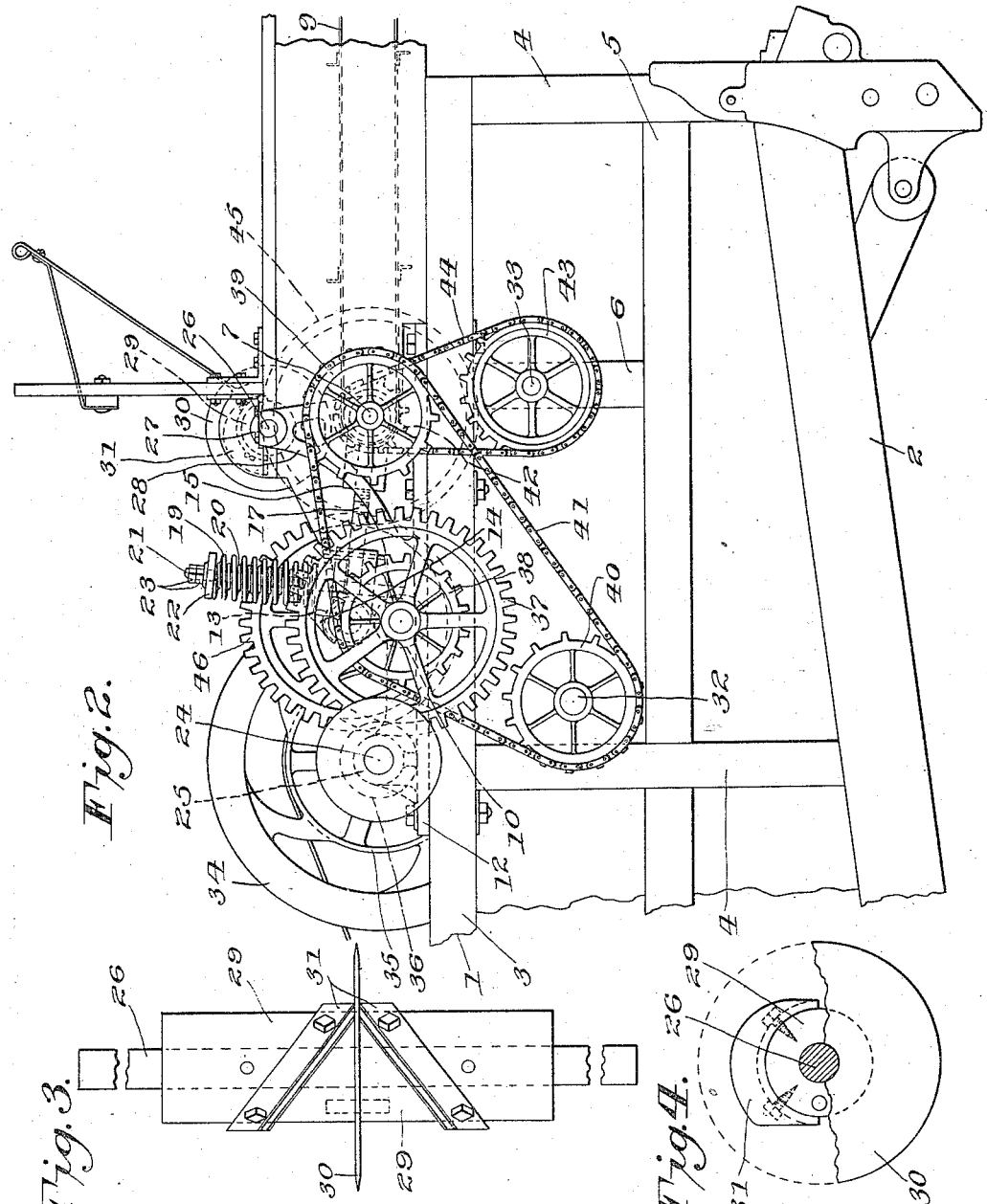

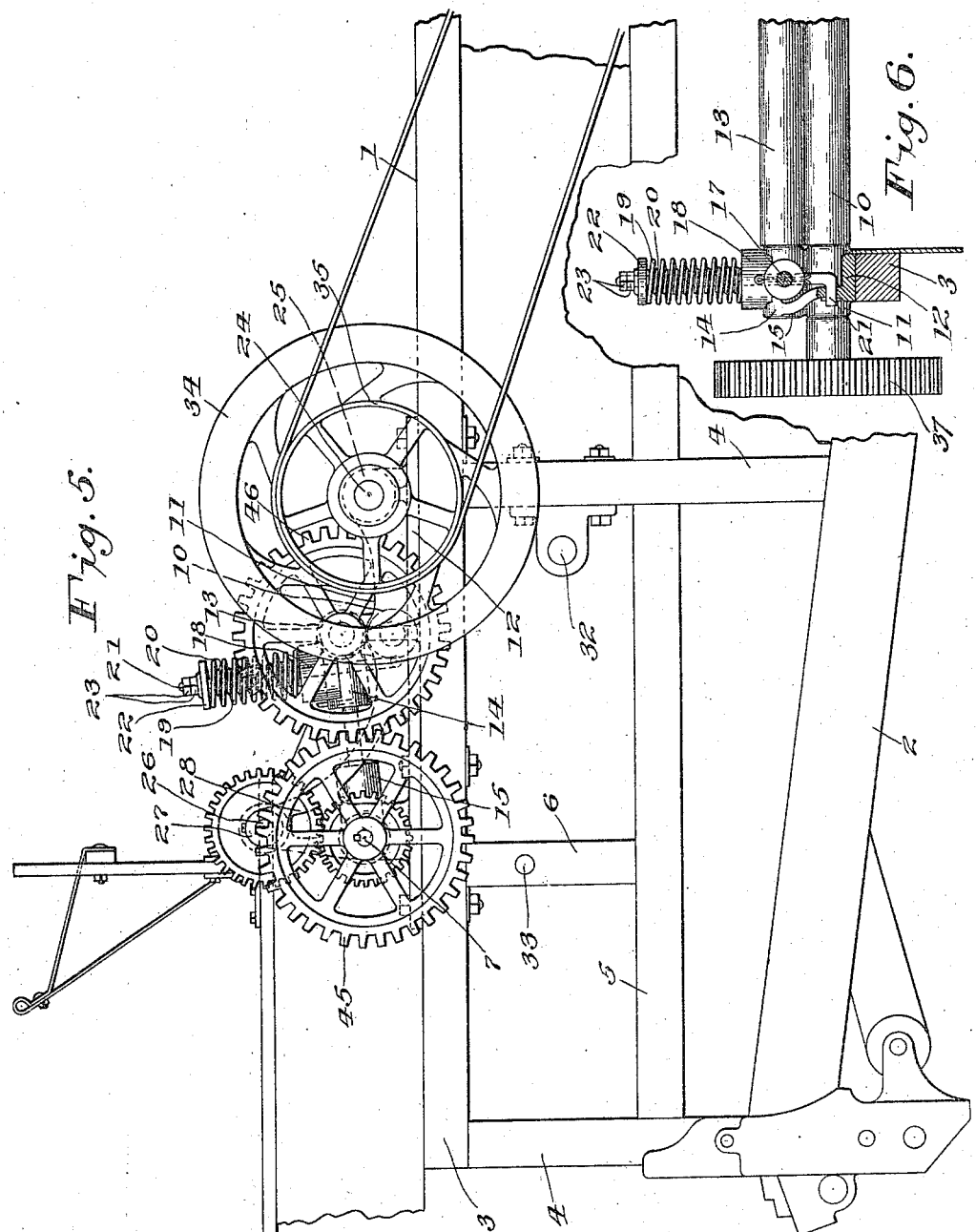

GEORGE L. PHELPS, OF CHICAGO, ILLINOIS, ASSIGNOR TO INTERNATIONAL HARVESTER COMPANY OF NEW JERSEY, A CORPORATION OF NEW JERSEY.

CORN HUSKER AND SHREDDER.

1,242,973.  Specification of Letters Patent.  Patented Oct. 16, 1917.

Application filed September 26, 1913. Serial No. 791,920.

*To all whom it may concern:*

Be it known that I, GEORGE L. PHELPS, a citizen of the United States, residing at Chicago, in the county of Cook and State of Illinois, have invented certain new and useful Improvements in Corn Huskers and Shredders, of which the following is a full, clear, and exact specification.

My invention relates to corn huskers and shredders, and consists in improved means for mounting and controlling the movement of the snapping rollers and in means whereby motion is transmitted from the shredder cylinder to other operative parts of the machine. The object of my invention is to simplify the construction of the machine and make it more efficient in operation. These objects are attained by means of mechanism, one embodiment of which is illustrated in the accompanying drawings, in which—

Figure 1 is a top plan view of part of a corn husking and shredding machine having my invention embodied in its construction;

Fig. 2 is a side elevation of Fig. 1;

Fig. 3 is a partial plan view of a spreader head;

Fig. 4 is an end view, partly in section, of Fig. 3;

Fig. 5 is a side elevation of Fig. 1 from the opposite side of the machine as seen in Fig. 2; and Fig. 6 is a detail part of the snapping roll mechanism.

The same reference numerals designate like parts throughout the several views.

1 represents the frame of the machine having a base sill member 2, an upper longitudinally disposed frame member 3 connected thereto by means of vertically disposed frame members 4. 5 represents an intermediate longitudinally disposed frame member secured to the vertical members 4, and 6 represents a short vertical frame member having its opposite ends secured to the members 3 and 5. 7 represents a feed shaft journaled in bearings 8 secured to the frame members 3 upon opposite sides of the machine and carrying a feed apron 9. 10 represents the lower snapping roll having its reduced ends journaled in bearing boxes 11 carried by base members 12 secured to opposite sides of the frame structure, and 13 represents the upper coacting snapping roll journaled in bearing boxes 14 forming part of swinging yoke members 15 having sleeves 16 that turn about the axis of the feed shaft 7, the sleeves being connected with the bearing boxes 14 by means of threaded rods 17, whereby the distance between the axis of roller 13 and feed shaft 7 may be properly regulated.

The bearing boxes 14 are provided with cup-shaped members 18 at their upper sides, in which are seated the lower ends of two coiled compression springs 19 and 20, the spring 20 being within spring 19, the springs having unequal force for the purpose of exerting variable pressure upon the upper roller in its operation. 21 represents a pressure regulating link having a hooked lower end received by an opening in the bearing box member 11 and extending upward within the springs is provided with a washer 22 and adjusting nuts 23. 24 represents a shredding cylinder shaft journaled in rear of the snapping rollers in bearing boxes 25 carried by the base member 12, and 26 a spreader shaft journaled above the feed shaft 7 in bearing boxes 27 carried by bracket members 28 that are integral with the base members 12, the spreader comprising spool members 29 that receive between them a band cutting disk 30, and 31 represents oppositely disposed spirally arranged stalk spreading ribs secured to the spools upon opposite sides of the band cutting disk. 32 represents a driving shaft for the husking rolls (not shown), and 33 a driving shaft for the ear agitator (not shown). 34 represents a fly wheel secured to one end of the shredder cylinder shaft, and 35 a driving pulley secured adjacent thereto.

Motion is transmitted to the various shafts from the shredder cylinder shaft by means of a pinion 36 secured to said shaft upon the opposite end from the fly wheel, the pinion meshing with a gear wheel 37 secured to the end of the lower snapping roller, and 38 represents a sprocket wheel secured to the same shaft inside of the gear wheel; 39 a sprocket wheel secured to the end of the feed shaft 7; 40 a sprocket wheel secured to the end of shaft 32, and 41 a sprocket chain operatively connecting the three sprocket wheels. 42 represents a sprocket wheel secured to the feed shaft 7 inside of the wheel 39; 43 a sprocket wheel secured to the end of shaft 33, and 44 a sprocket chain operatively connecting the two sprocket wheels.

Upon the opposite side of the machine, and upon the opposite end of the feed shaft 7, is secured a gear wheel 45 that meshes with a gear wheel 46 secured to the end of the shaft carrying the upper snapping roller. The shafts 7, 24 and 26, and the lower snapping roller, are all journaled in bearings forming a part of the base members 12, and are, therefore, securely held against displacement, and the swinging yoke members 15 will maintain the driving gears 45 and 46 upon the feed shaft 7, and the upper snapping roller 13 in proper mesh, and the rods 17 may be manipulated in a manner to regulate the degree of engagement of the teeth of the two gear wheels, and said degree will not change as the upper roller rises or falls in the operation of the machine. The springs 19 and 20 are made of different lengths and force so as to exert a relatively small resistance in opposing an initial rising movement of the upper snapping roller through a predetermined distance, which I prefer to be approximately $\frac{1}{2}''$, and a much greater resistance as that distance increases.

While I have in this application described one form which my invention may assume in practice, it is, of course, to be understood that the form shown herein is susceptible of modification without departing from the spirit of the invention.

What I claim as my invention, and desire to secure by Letters Patent, is:

1. In a corn handling machine, the combination of coacting upper and lower snapping rollers, the upper roller being permitted a rising and falling movement, a feed shaft, means for driving said shaft and rollers, and swinging extensible supporting means directly connecting said feed shaft with the upper roller.

2. In a corn husking and shredding machine, in combination, coacting upper and lower snapping rollers rotatable in opposite directions, the upper roller being spring-pressed and permitted a rising and falling movement, a feed shaft, means for driving said feed shaft and the lower roller in the same direction, extensible swinging yokes directly connecting said feed shaft with the upper roller, and a driving gear connection between said roller and shaft.

3. In a corn husking and shredding machine, in combination, coacting upper and lower snapping rollers rotatable in opposite directions, the upper roller being permitted a rising and falling movement, a feed shaft, means for driving said feed shaft and the lower roller in the same direction, swinging yokes adjustable in length and connecting said shaft with the upper roller, and a driving gear connection between said roller and shaft.

4. In a corn husking and shredding machine, in combination, upper and lower coacting snapping rollers rotatable in opposite directions, the upper roller being permitted a rising and falling movement, link connections between the bearing boxes of the two rollers, and two springs, one within the other, encircling the body of each link and operative to resist a rising movement of said upper roller, one of said springs being inoperative during the initial rising movement of said roller.

In testimony whereof I affix my signature, in the presence of two witnesses.

GEORGE L. PHELPS.

Witnesses:
W. LYMAN,
H. STUDEMEYER.